United States Patent [19]

Wakabayashi et al.

[11] Patent Number: 4,668,070
[45] Date of Patent: May 26, 1987

[54] POWER SUPPLY DEVICE OF A CAMERA

[75] Inventors: Hiroshi Wakabayashi, Yokohama; Hidenori Miyamoto; Hiroshi Terunuma, both of Ichikawa, all of Japan

[73] Assignee: Nippon Kogaku K. K., Tokyo, Japan

[21] Appl. No.: 826,005

[22] Filed: Feb. 4, 1986

[30] Foreign Application Priority Data

Feb. 12, 1985 [JP] Japan .............................. 60-17001[U]

[51] Int. Cl.⁴ .......................... G03B 7/00; G03B 17/02
[52] U.S. Cl. ...................................... 354/484; 354/288
[58] Field of Search ................................ 354/484, 288

[56] References Cited
U.S. PATENT DOCUMENTS
3,810,228  5/1974  Taguchi et al. ................. 354/484 X Primary Examiner—Michael L. Gellner
Attorney, Agent, or Firm—Shapiro and Shapiro

[57] ABSTRACT

A camera containing at least one first battery and at least one second battery therein includes first means supplied with an electric power by the at least one first battery, thereby becoming operable, second means supplied with an electric power by the at least one second battery, thereby controlling the operation of the first means, and third means operated to render the at least one second battery removable from the camera, the power supply from the at least one second battery to the second means being impeded by the third means being operated, the third means impeding the power supply from the at least one first battery to the first means prior to the impediment of the power supply from the at least one second battery to the second means, in response to the operation of the third means.

6 Claims, 7 Drawing Figures

POWER SUPPLY DEVICE OF A CAMERA

BACKGROUND OF THE INVENTION

1. Field of the Invention

This invention relates to a power supply device of a camera which uses first and second source batteries to effect power supply to discrete power-supplied portions.

2. Description of the Prior Art

Some of the power supply devices of cameras are designed such that portions to which the power supply and the non-power supply are frequently changed over (for example, a film feeding device, an automatic exposure device and a flash device) is supplied with an electric power by the first power source battery and portions to which the power supply is hardly cut off (for example, a memory IC for counter which stores the number of photographed frames and an IC for controlling said devices) is supplied with an electric power by the second power source battery. In the power supply device of this type, battery lids are provided discretely and therefore, it has sometimes happened that the battery lid for the first power source battery and the battery lid for the second power source battery are opened by mistake.

If the battery lid for the second power source battery is opened by mistake when the battery lid for the first power source battery should be opened, power supply will be effected from the first power source battery but not from the second power source battery and an unexpected electric current or electrical signal will flow and each IC may cause unexpected malfunctioning (for example, the counter function may be all cleared) or may be destroyed. Thus, in some power supply devices, it is not desirable to cut off only the power supply from the second power source battery or cut off the power supply from the second power source battery prior to cutting off the power supply from the first power source battery.

SUMMARY OF THE INVENTION

It is therefore an object of the present invention to provide a power supply device designed such that it is impossible to cut off only the power supply from a second power source battery and to cut off the power supply from the second power source battery prior to cutting off the power supply from a first power source battery.

To achieve the above object, in the present invention, design is made such that only after the power supply from the first power source battery has been cut off, the power supply from the second power source battery can be cut off, or in other words, when the second power source battery is to be taken out, it is required to cut off the power supply from the first power source battery prior thereto.

If such design is made, it will never happen that power supply is effected only from the first power source battery, that is, power supply will be effected from the first and second power source batteries or power supply will be effected only from the second power source battery, and therefore, the above-noted inconveniences will be well eliminated.

DESCRIPTION OF THE PREFERRED EMBODIMENTS

Figure 1:
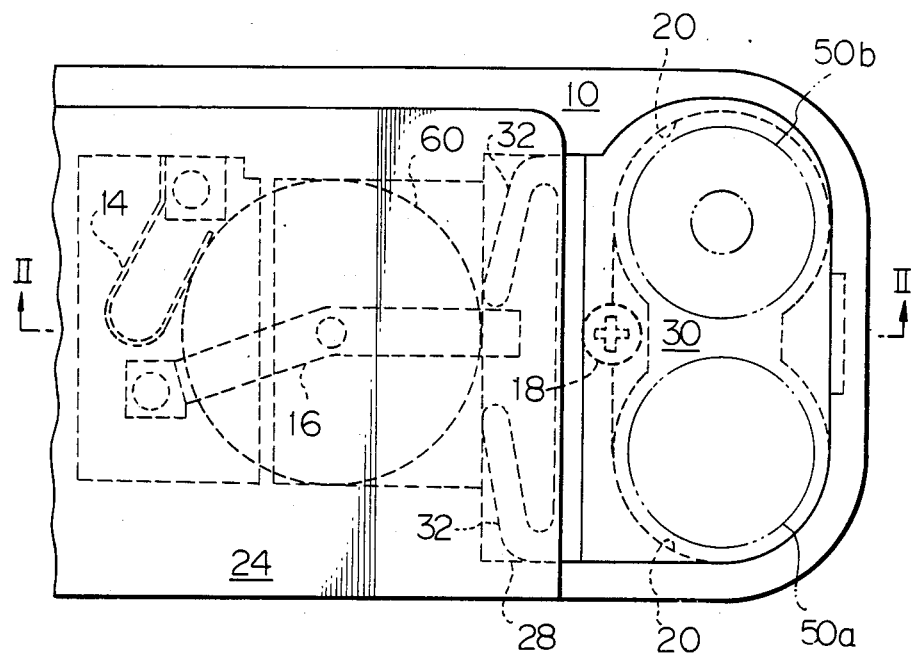
FIG. 1 is a front view showing a first embodiment of the present invention.
Figure 2:
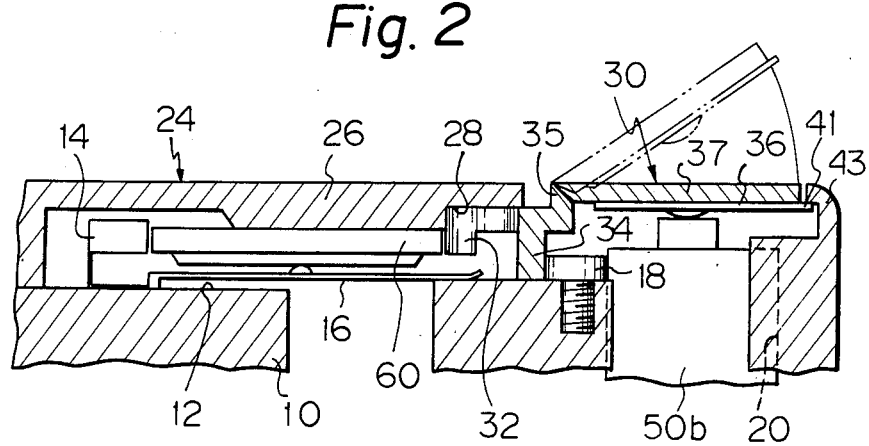
FIG. 2 is a cross-sectional view taken along line II—II in FIG. 1.

Some embodiments of the present invention will hereinafter be described with reference to the drawings. As shown in FIGS. 1 and 2, a U-shaped positive pole contact piece 14 and a plate-like negative pole contact piece 16 are secured to the surface 12 of a camera body 10, and a limit screw 18 is mounted on said surface. A recess 20 for containing therein main power source batteries 50a and 50b as a first power source battery is formed in one end portion of said surface 12.

A disk-like auxiliary power source battery 60 as a second power source battery is placed on the surface 12, and the positive pole contact piece 14 and the negative pole contact piece 16 are in contact with the positive pole and the negative pole, respectively, of the battery 60. A bottom cover 24 is disposed outside the battery 60 and attached to the camera body 10. The bottom cover 24 presses the battery 60 by its thick portion 26 and is provided with a cut-away 28 in the fore end portion thereof.

A battery lid 30 is disposed outside the batteries 50a and 50b, and this lid 30 is provided with a bearing portion 36 which bears against an L-shaped engaging portion 32 resiliently deformable and engaged with the cut-away 28 of the bottom cover 24 and against the limit screw 18, and is biased rightwardly by the resiliency of the engaging portion 32. A contact piece 36 for connecting the negative pole of the battery 50a and the positive pole of the battery 50a is secured to the inner surface of the lid 30. One end portion 41 of this contact piece 36 is engageable with the curved portion 43 of the camera body 10.

Figure 7:
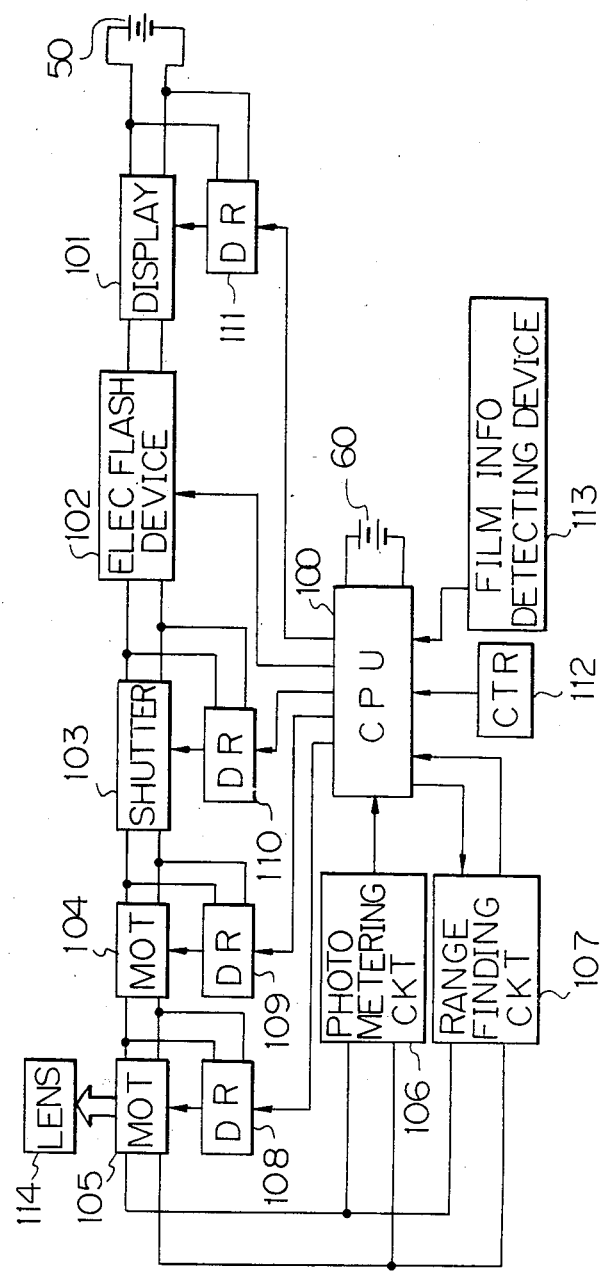
FIG. 7 is a block diagram showing the electric system in the first embodiment.

An electric system supplied with an electric power by the battery 50 (the batteries 50a and 50b together constitute a battery 50) and the battery 60 will now be described with reference to FIG. 7.

CPU 100 is comprised of an IC and is operated by the auxiliary power source 60. A display unit 101 displays the photographing information of the camera (such as film speed and the number of photographed film frames) by a driver 111 in accordance with the signal of CPU 100. As regards an electronic flash device 102, the emission of flashlight to an object to be photographed is controlled by CPU 100. A shutter 103 has shutter blades for lens shutter, a magnet for opening the shutter blades and a magnet for closing the shutter blades, and is controlled by CPU 100 through a driver 110. A motor 104 effects the winding-up of the film from a film cartridge loaded into the camera and the rewinding of the film into the cartridge, by a signal supplied from CPU 100 through a driver 109. A motor 105 drives a photo-taking lens 114. CPU 100 controls a driver 108 and drives the motor 105 in accordance with a signal from a range finding circuit 107 indicative of the distance to the object to be photographed so that the image of the object to be photographed by the photo-taking lens 114 is focused to a predetermined plane of the camera. A photometering circuit 106 inputs to CPU 100 a signal indicative of the brightness of the object to be photographed, and a counter 112 has a switch adapted to be mechanically closed each time the film is wound up from the cartridge by a frame for photography, and CPU 100 counts the pulses generated by ON-OFF of this switch. A film information detecting device 113 is constituted by a plurality of electrodes which are in contact with a pattern comprising an insulating portion and an electrically conductive portion for indicating the film speed which are formed on the surface of the film cartridge. CPU 100 reads the film speed by the plurality of electrodes of the film information detecting device 113, reads the output of the photometering circuit 106 and causes the driver 110 to control the two magnets of the shutter 103. The main power source battery 50 spplies an electric power to the display unit 101, the electronic flash device 102, the shutter 103, the motors 104 and 105, the photometering circuit 106, the range finding circuit 107 and the drivers 108-111, and the auxiliary power source battery 60 supplies an electric power to CPU 100. CPU 100 also has an inner memory for storing the read film speed and the number of photographed frames therein. The number of lines from CPU 100 to other circuit or device is one, and it is to be understood that this includes a parallel digital signal comprising a plurality of lines. This also holds true of the line from the device 113 to CPU 100.

Operation of the present embodiment will now be described. To interchange the auxiliary power source battery 60, the engaging portion 32 is first resiliently deformed and the battery lid 30 is moved leftwardly as viewed in FIG. 2. Thereupon, the engagement between the end edge portion 41 of the contact piece 36 and the curved portion 43 of the camera body is released and therefore, the lid portion 37 of the battery lid 30 is opened upwardly about the bent portion 35 as indicated by dots-and-dash line in FIG. 2. At this moment, the contact piece 36 separates from the negative pole of the battery 50a and the positive pole of the battery 50 and the power supply from the battery 50 is stopped. When the lid 30 is opened, the battery 50 can be taken out.

Figure 3:
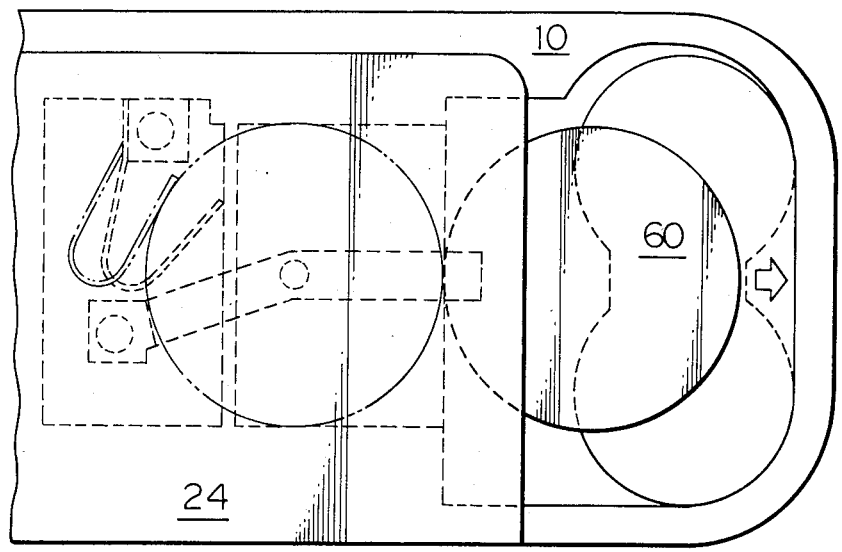
FIGS. 3 and 4 are a front view and a cross-sectional view, respectively, for illustrating the operation of the first embodiment.
Figure 4:
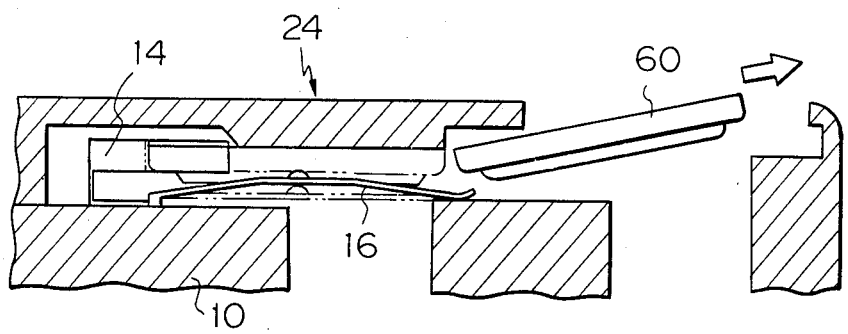

Subsequently, when the limit screw 18 is removed from the camera body 10 (this is accomplished by pushing the lid 30 leftwardly and resiliently deforming the engaging portion 32), the restraint of the foot portion 34 by the screw is released and therefore, if the battery lid 30 is drawn out rightwardly as viewed in FIG. 4, the auxiliary power source battery 60 will be pushed out rightwardly by the resilient force of the positive pole contact piece 14, as shown in FIGS. 3 and 4. To interchange the main power source battery 50, only the first half of the above-described procedure may be effected.

After the consumed battery 60 has been taken out in accordance with the above-described procedure, a new auxiliary power source battery 60 is inserted in accordance with a procedure converse to the above-described procedure. That is, the new battery 60 may be contained into the void between the camera body 10 and the cover 30, the battery lid 30 may be positioned at a predetermined position and restrained by the limit screw 18, the lid portion 37 may be opened and the main power source battery 50 may be contained into the void 20, whereafter the lid 30 may be moved leftwardly and the endedge portion 41 may be brought into engagement with the curved portion 43, and then the lid 30 may be closed.

As described above, there is only one battery lid 30 in the present embodiment, and when the main power source battery 50 has been consumed, only this battery is taken out, and when the auxiliary power source battery 60 has been consumed, the main power source battery 50 and the auxiliary power source battery 60 are taken out (the interchange of the batteries 50 and 60 is effected with the lid 30 opened). That is, it is not possible that only the auxiliary power source battery 60 is taken out and in the meantime, the power is supplied from the main power source battery 50. Accordingly, it never happens that the motor 104, etc. are caused to malfunction or the IC is destroyed by the power supply only from the battery 50. Also, when the battery 50 is to be taken out, the lid portion 37 of the lid 30 may be opened upwardly, and when the battery 60 is to be taken out, the entire lid 30 may be drawn out rightwardly and therefore, malfunctioning is eliminated and the space occupied is small.

Figure 5:
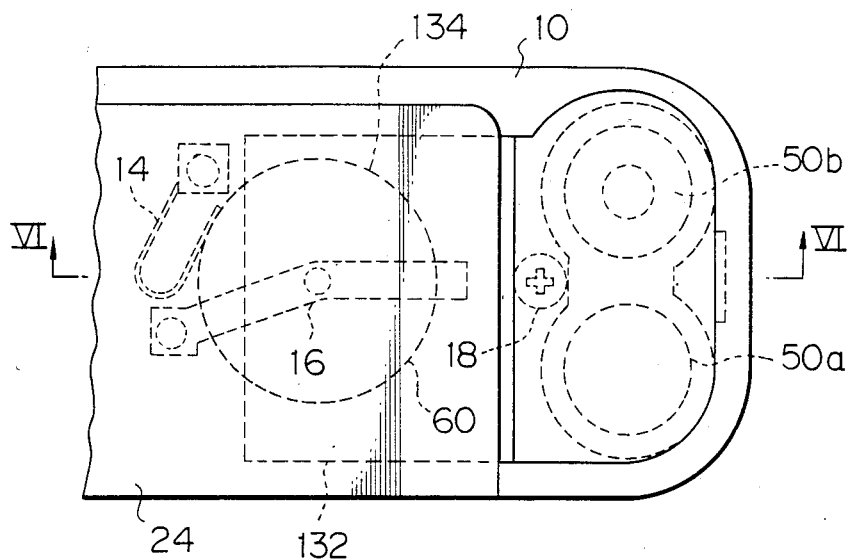
FIG. 5 is a front view showing a second embodiment of the present invention.
Figure 6:
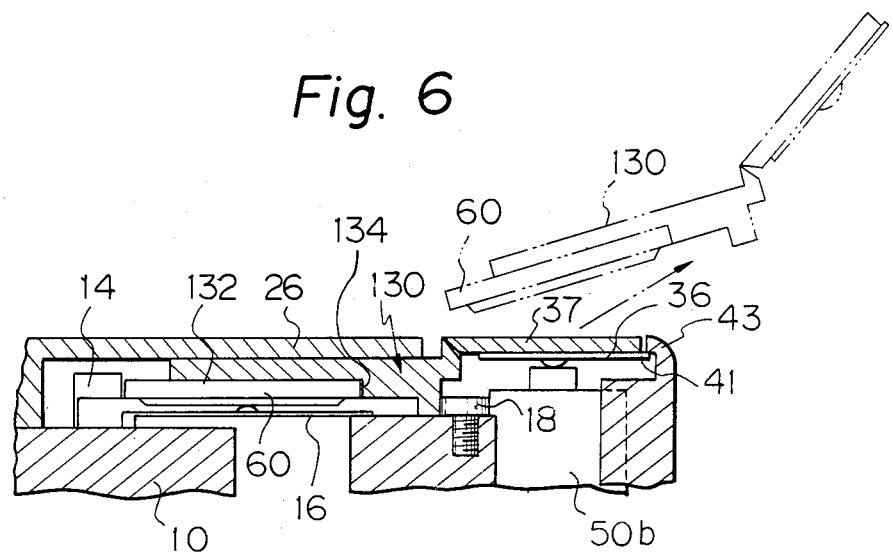
FIG. 6 is a cross-sectional view taken along line VI—VI in FIG. 5.

Another embodiment of the present invention will now be described with reference to FIGS. 5 and 6. For simplicity of description, portions of this embodiment similar to those of the previous embodiment are given similar reference numerals and need not be described, and only different portions will hereinafter be described. A feature of the present embodiment is that a battery lid 130 is provided with an extension 132 extending toward the auxiliary power source battery 60 and this extension is formed with a cut-away 134 for containing and holding the battery 60 therein.

When the battery 60 is to be interchanged, the battery 50 is taken out, whereafter the screw 18 is taken out, and if the lid 130 is moved rightwardly (as viewed in FIG. 6) and drawn out, the battery 60 can be taken out while being held by the lid 130 and thus, the trouble of taking out the battery 60 is saved. In the present embodiment, the biasing force for bringing the end edge portion 41 of the contact piece 36 fixed to the lid 130 into engagement with the curved portion 43 of the camera body 10 is provided by a spring 14.

The above-described embodiments are merely a part of the present invention and of course, the present invention is never restricted to these embodiments. For example, in the previously described embodiments, the battery lid of the battery 50 and the battery lid of the battery 60 are provided by the single lid 30 or 130, whereas this is not indispensable, but the battery lids of the batteries 50 and 60 may be provided discretely and design may be made such that the power supply circuit of the main power source battery 50 is cut off by a switch adapted to be opened in response to a preliminary operation for cutting off the power supply by the auxiliary power source battery 60, for example, the operation of releasing a lock device for locking the battery lid of the auxiliary power source battery 60. Also, in the second embodiment shown in FIGS. 5 and 6, when the auxiliary power source battery 60 is to be taken out, the battery lid 130 need not always separate from the bottom cover 24, but may be adapted to slide on this cover.

According to the present invention, as has hitherto been described, it never happens that the power is supplied only from the first power source battery and therefore, destruction of the IC or malfunctioning of the display and counter is prevented. This also means that any electric circuit for protecting the IC from said malfunctioning becomes unnecessary, and the number of parts is reduced, whereby the cost of manufacture is reduced and the space required for the power supply device can be made small.

We claim:

1. A camera containing at least one first battery and at least one second battery therein, said camera including:
   (a) first means supplied with an electric power by said at least one first battery, thereby becoming operable;
   (b) second means supplied with an electric power by said at least one second battery, thereby controlling the operation of said first means; and
   (c) third means operated to render said at least one second battery removable from said camera, the power supply from said at least one second battery to said second means being impeded by said third means being operated, said third means impeding the power supply from said at least one first battery to said first means prior to the impediment of the power supply from said at least one second battery to said second means, in response to the operation of said third means.

2. A camera according to claim 1, wherein said third means has an operating member designed to be removed from said camera by said operation.

3. A camera according to claim 2, wherein said third means has a pivotable member pivotably mounted relative to said operating member, and an electrical conductor adapted to contact said at least one first battery to thereby make the power supply to said second means possible, said electrical conductor being secured to said pivotable member.

4. A camera operable by at least one first battery and at least one second battery, said camera including:
   (a) housing means formed with a first chamber for containing said at least one first battery therein and a second chamber for containing said at least one second battery therein, said housing means being also formed with a first opening through which said at least one first battery may be put into and out of said first chamber and a second opening through which said at least one second battery may be put into and out of said second chamber;
   (b) first power-supplied means supplied with an electric power from said at least one first battery;
   (c) second power-supplied means supplied with an electric power from said at least one second battery; and
   (d) a lid member for closing said first and second openings, said lid member being designed to open said first and second openings by operation, said lid member being also designed such that the power supply from said at least one first battery and said at least one first battery and said at least one second battery to said first and second power-supplied means is impeded by said operation, the power supply from said at least one first battery to said first power-supplied means being impeded and thereafter the power supply from said at least one second battery to said second power-supplied means being impeded, by said operation of said lid member.

5. A camera according to claim 4, wherein said second power-supplied means is designed to control the operation of said first power-supplied means.

6. In a camera having first and second means and capable of containing therein at least one first battery for supplying an electric power to said first means and at least one second battery for supplying an electric power to said second means, the improvement comprising:
   impeding means for impeding the power supply from said at least one first battery and said at least one second battery to said first and second means, said impeding means impeding the power supply from said at least one first battery to said first means and thereafter impeding the power supply from said at least one second battery to said second means.

* * * * *